(12) United States Patent
Deshpande et al.

(10) Patent No.: US 8,639,645 B2
(45) Date of Patent: *Jan. 28, 2014

(54) DYNAMICALLY RECONFIGURING PREDICTIVE ANALYTICS WITHIN WORKFLOWS USING SELECTIVE USER FEEDBACK

(75) Inventors: Prasad Manikarao Deshpande, Mumbai (IN); Karin Murthy, Bangalore (IN); Deepak S. Padmanabhan, Kerala (IN); Girish Venkatachaliah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,739

(22) Filed: Aug. 28, 2012

(65) Prior Publication Data

US 2012/0323835 A1  Dec. 20, 2012

Related U.S. Application Data

(63) Continuation of application No. 12/948,249, filed on Nov. 17, 2010, now Pat. No. 8,494,995.

(51) Int. Cl.
*G06F 17/00* (2006.01)
*G06N 5/02* (2006.01)

(52) U.S. Cl.
USPC ............................................... 706/46

(58) Field of Classification Search
None
See application file for complete search history.

(56) References Cited

U.S. PATENT DOCUMENTS

| | | | |
|---|---|---|---|
| 8,056,052 B2 * | 11/2011 | Deshpande et al. | 717/107 |
| 8,135,579 B2 * | 3/2012 | Kummamuru et al. | 704/9 |
| 8,140,362 B2 * | 3/2012 | Deshpande et al. | 705/7.11 |
| 8,205,153 B2 * | 6/2012 | Chenthamarakshan et al. | 715/246 |
| 8,271,479 B2 * | 9/2012 | Bhide et al. | 707/716 |
| 8,407,221 B2 * | 3/2013 | Murthy et al. | 707/736 |
| 8,412,734 B2 * | 4/2013 | Kulkarni et al. | 707/774 |
| 8,494,995 B2 * | 7/2013 | Deshpande et al. | 706/46 |
| 8,515,947 B2 * | 8/2013 | Bhide et al. | 707/716 |
| 8,515,955 B2 * | 8/2013 | Bhide et al. | 707/732 |

* cited by examiner

*Primary Examiner* — Michael B Holmes
(74) *Attorney, Agent, or Firm* — Ference & Associates LLC

(57) ABSTRACT

Methods and arrangements for managing and enhancing workflow. A work item is accepted and the is routed from a first node to a second node based on a predictive analytics model. The predictive analytics model is validated, and is reconfigured responsive to the validating.

8 Claims, 4 Drawing Sheets

DYNAMICALLY RECONFIGURING PREDICTIVE ANALYTICS WITHIN WORKFLOWS USING SELECTIVE USER FEEDBACK

CROSS REFERENCE TO RELATED APPLICATION

This application is a continuation of U.S. patent application Ser. No. 12/948,249, entitled SYSTEMS AND METHODS FOR DYNAMICALLY RECONFIGURING PREDICTIVE ANALYTICS WITHIN WORKFLOWS USING SELECTIVE USER FEEDBACK, filed on Nov. 17, 2010, which is incorporated by reference in its entirety.

BACKGROUND

Workflow management in geographically contained or distributed organizations typically seeks to efficiently assign tasks to resources (or individuals positioned to or capable of accommodating one or more tasks). Predictive analytics capabilities are often used in workflow management to choose a branch or path to which a workflow can next be directed. For instance, such analytics can make use of historical information to permit automated decision making on choosing a branch or path, or at least can provide information, insight or data that would assist in manual decision making. However, conventional efforts have proven to be insufficient in continually providing reasonably efficient workflow management over longer periods of time.

BRIEF SUMMARY

In summary, one aspect of the invention provides a method comprising: accepting a work item; routing the work item from a first node to a second node based on a predictive analytics model; validating the predictive analytics model; and reconfiguring the predictive analytics model responsive to said validating.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
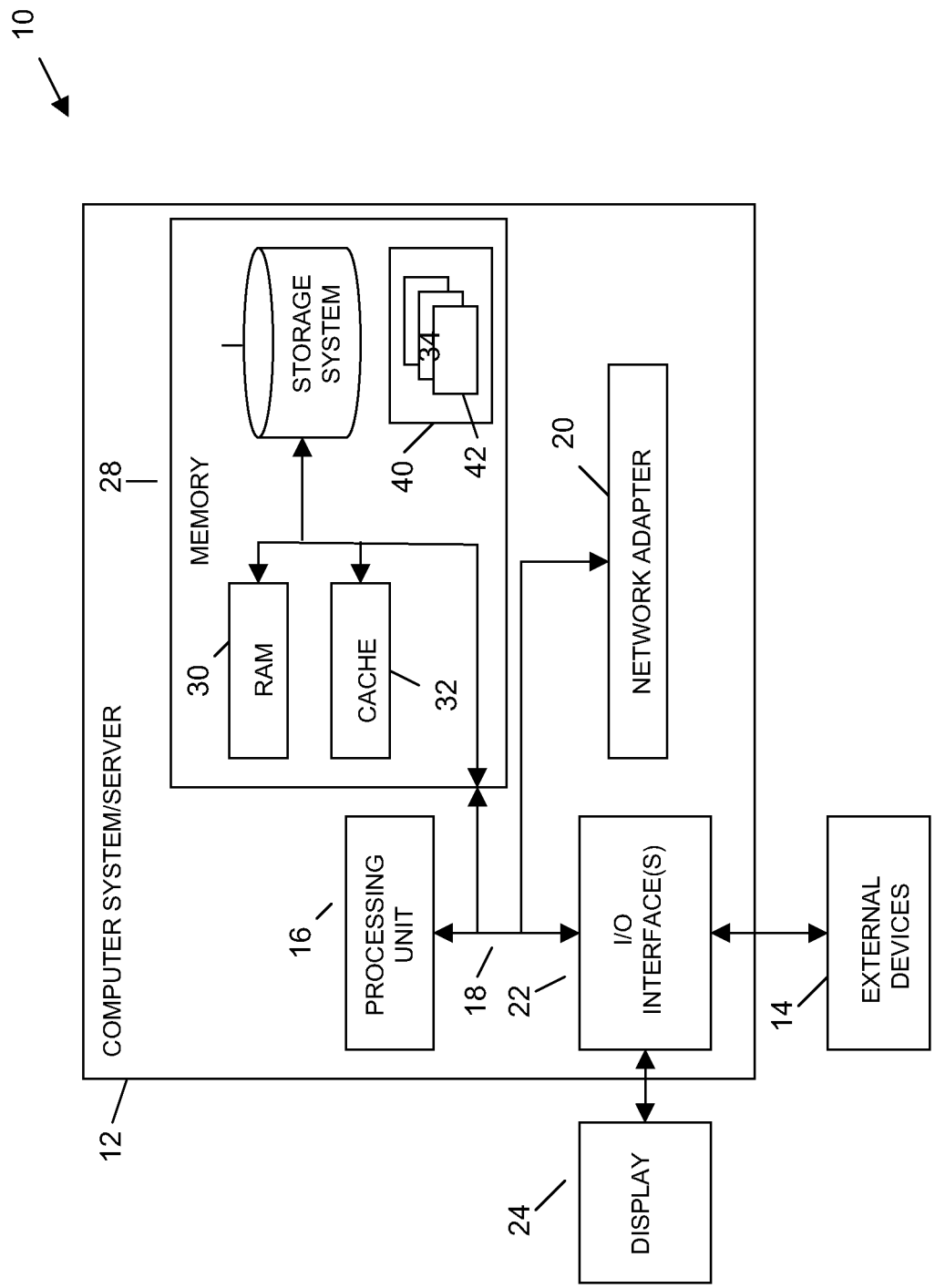
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
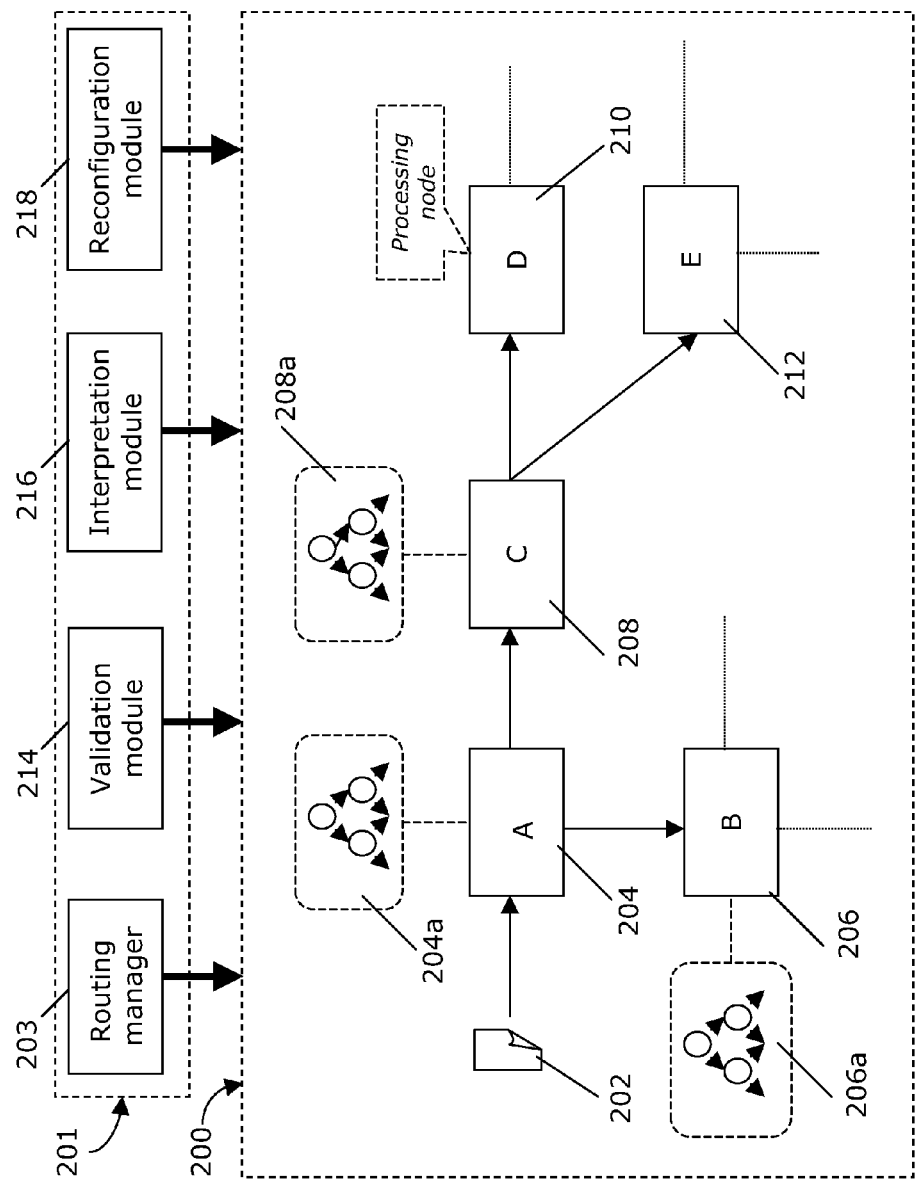
FIG. 2 schematically illustrates a workflow environment with workflow manager.
Figure 3:
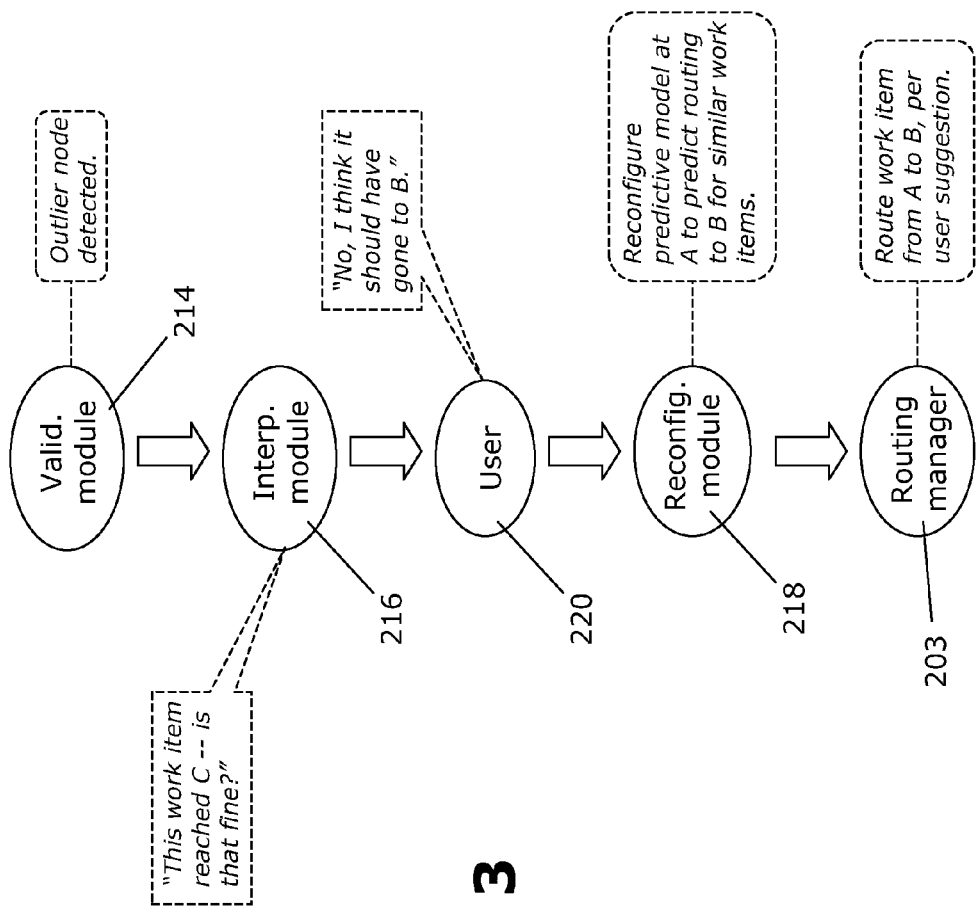
FIG. 3 schematically illustrates a process flow of predictive model reconfiguration.

The disclosure now turns to FIGS. 2 and 3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2 and 3 can be performed or utilized by way of a processing unit or units and system memory such as those indicated, respectively, at 16 and 28 in FIG. 1, whether on a server computer, a client computer, a node computer in a distributed network, or any combination thereof.

There are broadly contemplated herein, in accordance with at least one embodiment of the invention, methods and arrangements for continuously monitoring the performance of predictive models in workflow management via a provision for user validation and for reconfiguration of workflow models to ensure that models adapt to changing trends and, e.g., recover from overfitting (i.e., when the model becomes so excessively complex that it attempts to describe random errors or noise rather than just the underlying relationship).

FIG. 2 schematically illustrates a sample conventional workflow environment 200, managed by a workflow manager 201. Workflow manager 201 includes a routing manager 203 which routes a work item 202 between nodes, responsive at least in part to input from predictive models 204a/206a/208a (the function of which will be appreciated more fully below). Routing manager 203 embraces a relatively simple function, that is, of employing a predictive model's suggestion to route the work item 202 accordingly. Being so simple, the routing manager 203 could be embodied by a simple piece of code resident in any node, but could alternatively be modeled, for instance, as a separate, dedicated component.

Typically, as shown, a work item 202 is input to Node A (204). Node A (204) includes a predictive model 204a that then undertakes processing, and automatically routes, or provides a suggestion for routing, of the work item 202 to either of Node B (206) or Node C (208), based on what the predictive model 202a suggests. Nodes B/C (204/206) themselves include their own corresponding predictive models 204a and 206a, respectively, which are employed for further routing beyond those nodes.

Generally, as work items progress through the different steps in the flow, the system may be able to assess whether some error could have occurred. For example, if work item 202 arrives at Node C 208 and it is determined that this is very much unlike work items that historically arrive at Node C 208, it is probable that the predictive model 202a at Node A 202 wrongly chose to route the work item to Node C 208 instead of to Node B 206. Such an error by the predictive model 202a at Node A 202 might then not be discovered until the progress as far as nodes downstream from Node C 208, such as Nodes D or E (210 and 212, respectively), as shown.

In accordance with at least one embodiment of the invention, there is broadly contemplated herein an arrangement that aims to identify possible mistakes as early as possible while at the same time avoiding false positives. Once such possible mistakes are identified, they can be validated by the user.

In accordance with at least one embodiment of the invention, three additional components are provided with workflow manager 201. A validation module 214 assesses whether a current work-item, in a processing node configuration, is to be sent to the user for review. Further, a module 216 for response gathering and interpretation employs a smart arrangement, wherein the system determines which predictive models are to be reconfigured. Additionally, a module 218 for reconfiguration assimilates a chosen predictive model and reconfigures the same based upon a suggestion of the user.

In accordance with an embodiment of the invention, validation module 214 undertakes simple outlier detection in the following manner. If work item 202 has reached a given processing node (e.g., Node B 206) appears unusual as compared to historical work items that have arrived at that node, then work item 202 is classified as an outlier. Such "unusual" work items that arrive could come about, e.g., from misrouting at an upstream node. By way of an illustrative and non-restrictive example of "unusualness", consider an application of insurance claims work, wherein one of the attributes is the location of a claimant, assume that a node has consistently been receiving claims from one geographic location. If it suddenly then receives a claim from a completely different geographic location, then this could be considered "unusual". In operation, such deviations could be detected by computing some distributions (e.g., histogram of probabilities for various origin locations) based on historical work items, and estimating the unusualness of an incoming work item based on how less probable it is, based on the probability distribution. previously computed.

In accordance with an embodiment of the invention, validation module 214 also ascertains agreement on aggregate distributions in a recent time window by reviewing statistics that are maintained on a recent window, e.g., from a predetermined time period such as the previous month. If an unusually high number of occurrences of a particular attribute value starts occurring or getting missed, as compared to other historical window statistics, this could indicate a significant change in the trend, in which case it can be ascertained that performance of the earlier predictive models cannot be relied upon. A simple, non-restrictive and illustrative working example could be as follows. Consider an insurance claim processing task that includes an "Identity Check" node. Over a large historical time window (e.g., last 3 years), there may be statistics indicating that "Identity Check" was necessitated for 70% of all work items originating from geographical region "A" in the system. Suddenly, over a more recent time window (last 3 months), it is determined that "Identity Check" was necessitated for only 10% of claims originating from region "A" in the system. Since this is a significant change in the trend, it may well be desirable to reassess the reliability of the predictive model in an upstream node from "Identity Check", particularly, a node that serves to determine whether a work item needs to be sent to the "Identity Check" node or can be bypassed.

In accordance with an embodiment of the invention, validation module 214 also conducts random sampling by providing a small random sample of configurations for user reviews. This can assist the system in re-calibrating its underlying assumptions about what is correct (and hence, what is not to be validated) could also be refined. Such sample configurations, in accordance with an embodiment of the invention, aim to expose routing decisions made in each configuration. An attempt is thus made to validate from the user as to whether such routing decisions made in the sample configurations presented to him/her are do appear reasonable to him/her. Thus, rather than containing what was handled by certain nodes, the sample configurations would focus on what decisions have been made by routing managers at certain times.

In accordance with at least one embodiment of the invention, the module 216 for response interpretation acts to determine, with good accuracy, those models that might require reconfiguration. In this vein, users may be posed with various queries. For example, one simple query involves asking where else the user thinks the work item should have gone. On the other hand, if the system ascertains that the current work item 202 is more similar to work items occurring in some (e.g., Nodes A and B 204/206) it could pose questions such as, "If you think the work item should not have reached here, do you think it should be sent to A or B?", thus making the job of the user easier. Similarity can be determined via any of a wide variety of known methods; see, for example, Gisli Hjaltason and Hanan Samet, "Index Driven Similarity Search in Metric Spaces", in ACM Transactions on Database Systems, 28(4), December 2003 and Dekang Lin, "An Information-Theoretic Definition of Similarity", in the 15th International Conf. on Machine Learning, pp. 296-304, 1998. Upon employing a similarity technique, a threshold is then employed to determine whether or not to query a user.

Thence, the module 216 for interpretation gathers one or more responses from the user, and the system then acts to estimate which predictive models need to be reconfigured. For example, if the user suggests that a work item should go to Node C 208 instead of Node B 206 (where it may have mistakenly arrived), the reconfiguration module 218 (see below) would then accept this suggestion and would determine that the most proximate common ancestor of Nodes B and C 206/208 would need to be reconfigured, as well as some intervening nodes between the common ancestor and Node B 206. In accordance with at least one embodiment of the invention, a module 218 for model reconfiguration acts as follows. First, let it be assumed in accordance with a non-restrictive example embodiment that the system has discovered that predictive model 204a has to sent work item 202 to Node C 208 instead of to Node B 206. The model reconfiguration module then simply adds [W,A] to the training set and re-train the model. In accordance with at least one variant embodiment, a model could be minimally adapted just as is done in many active learning approaches. Training, as understood in accordance with at least one embodiment of the invention, involves a process of building a model to describe the labels in training data. This is also known as "supervised learning" since the training data have labels. For background purposes, supervised learning is discussed, for example, at http://en.wikipedia.org/wiki/Supervised_learning.

FIG. 3 schematically illustrates a sample process flow of predictive model reconfiguration, in accordance with at least one embodiment of the invention. FIG. 3 merely provides an illustrative and non-restrictive example of steps that can be undertaken towards reconfiguring a predictive model. Joint reference can also be made to FIG. 2 for some of the components referred to herebelow.

Validation module 214 first detects an outlier node, as discussed hereinabove. Thence, interpretation module 216 queries a user 220 as to whether a work item 202 is meant to have reached Node C 208. The querying can be undertaken in essentially any suitable manner, e.g., via a pop-up window at a Graphical User Interface, wherein several buttons are included for different possible user responses. The user 220 responds that the work item instead should have gone to Node B 206. Reconfiguration module 218 then reconfigures the predictive model 204a at Node A 204 in order that similar or analogous work items in the future may be routed to Node B 206 instead of to Node C 208. Finally, once a new workflow takes place, routing manager 203 undertakes the routing to Node B 206.

In brief recapitulation, there are broadly contemplated herein, in accordance with at least one embodiment of the invention, systems and methods for leveraging predictive modeling capabilities in workflows act as follows. Many branching nodes have predictive models associated with them that suggest the branch to take for a particular work-item. Predictive model suggestions are used in moving work-items through the work flow either automatically or semi-automatically. Periodic validation takes place where certain configurations are validated with the user. Predictive models are regularly tuned, based on user feedback, in order to keep the models current.

By way of further clarification of validation in accordance with at least one embodiment of the invention, it should be recognized that most predictive models have a confidence associated with their suggestions. Thus, a sample predictive model output could be interpreted as saying "This work item should go to node B, and I am 60% confident about this suggestion". When the confidences are within ranges that could be construed as uncertain (e.g., 40-60%) or unreliable (e.g., 0-40%), validation can then be initiated. When the predictive model is next "very confident" about its suggestion (e.g., 60% confidence level or higher), then it is reasonable to pursue such a suggestion, since higher confidence indeed indicates a greater likelihood that a suggestion is correct).

Figure 4:
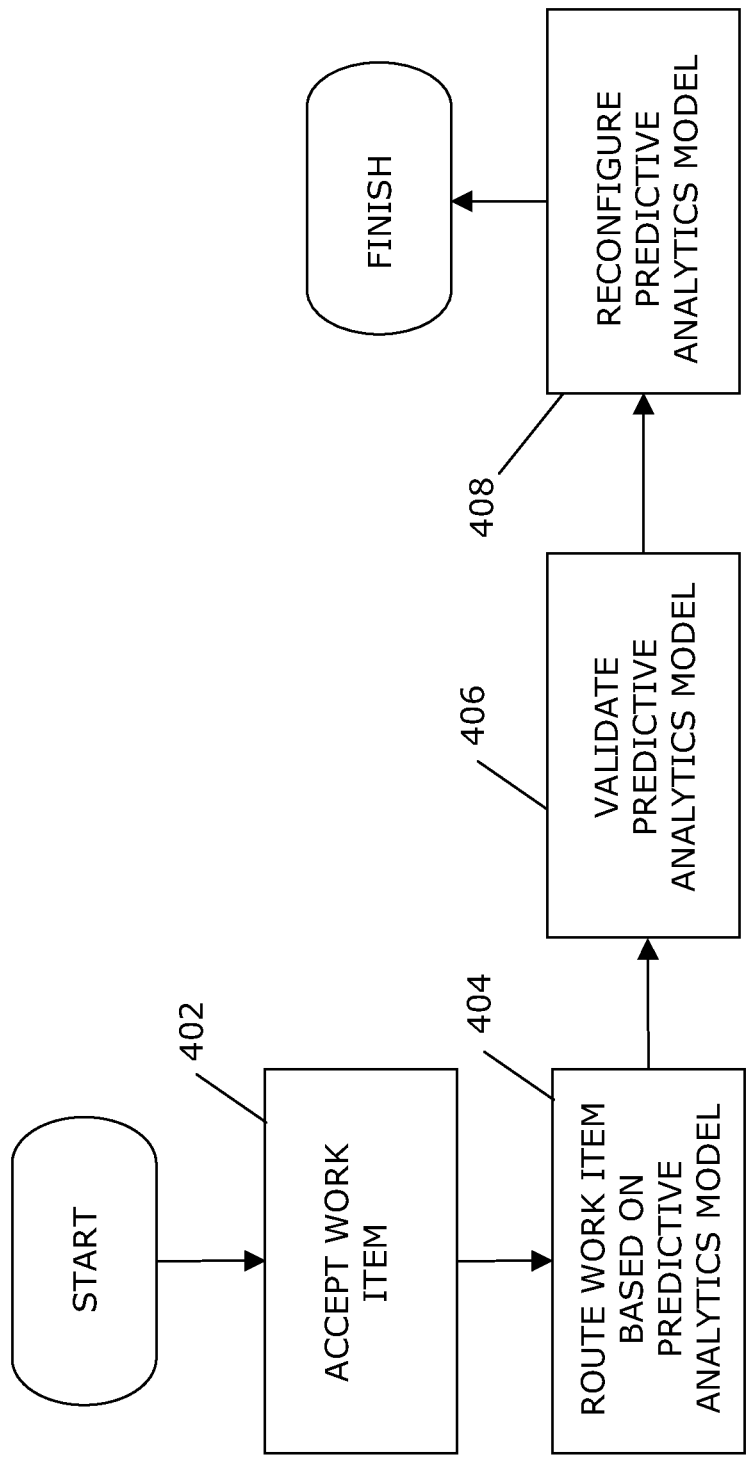
FIG. 4 sets forth a process more generally for managing and enhancing workflow.

FIG. 4 sets forth a process more generally for managing and enhancing workflow, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 4 can be performed by way a processing unit or units and system memory such as those indicated, respectively, at 16 and 28 in FIG. 1.

As shown in FIG. 4, a work item is accepted (402) and the work item is routed from a first node to a second node based on a predictive analytics model (404). The predictive analytics model is validated (406), and is reconfigured responsive to the validating (408).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
accepting a work item;
routing the work item from a first node to a second node based on a predictive analytics model;
validating the predictive analytics model; and
reconfiguring the predictive analytics model responsive to said validating.

2. The method according to claim 1, wherein:
said validating comprises querying a user to suggest a routing change of the work item; and
said reconfiguring comprises reconfiguring the predictive analytics model based on the suggested routing change.

3. The method according to claim 2, wherein said validating further comprises ascertaining whether a node is a candidate for a routing change.

4. The method according to claim 3, wherein said ascertaining whether a node is a candidate comprises reviewing historical statistics of work item routing to nodes.

5. The method according to claim 3, wherein said querying comprises querying the user upon ascertaining a candidate node for a routing change.

6. The method according to claim 5, wherein said querying comprises guiding the user via providing a narrowed set of choices for candidate nodes for routing changes.

7. The method according to claim 3, wherein said reconfiguring comprises choosing the predictive analytics model for reconfiguration based on its association with an ancestor node of two more candidate nodes for routing changes.

8. The method according to claim 2, wherein:
said validating comprises providing a user with random samples of work item routings to nodes; and
said querying comprises querying the user to suggest a routing change from among the random samples.

* * * * *